United States Patent [19]

Gower

[11] 4,069,793

[45] Jan. 24, 1978

[54] AUTOMATIC PET FEEDER

[76] Inventor: Samuel Gower, 1 Green Place, Setauket, N.Y. 11785

[21] Appl. No.: 689,355

[22] Filed: May 24, 1976

[51] Int. Cl.² ............................................. A01K 5/02
[52] U.S. Cl. ................................. 119/51.13; 119/51.5
[58] Field of Search .................. 119/51.11, 51.13, 51.5

[56] References Cited

U.S. PATENT DOCUMENTS

| | | | |
|---|---|---|---|
| 3,196,835 | 7/1965 | Bergevin | 119/51.11 |
| 3,648,660 | 3/1972 | Esquival | 119/51.11 |
| 3,900,008 | 8/1975 | Jinnette | 119/51.13 |

Primary Examiner—Hugh R. Chamblee
Attorney, Agent, or Firm—Allen D. Brufsky

[57] ABSTRACT

Pet feeding apparatus including a plurality of food-containing tubes, each of which is opened at spaced time intervals by a trap door held closed by the retractable plunger of an electrical relay connected in electrical series to an electrical timer. Upon receiving a signal from the timer, the plunger of the relay is retracted to allow the trap door to open by gravity to dispense pet food in one of the food tubes. Simultaneously, a solenoid valve is opened for a fixed time interval to drain water from a water tank to mix with the pet food and to supply drinking water for the pet.

2 Claims, 1 Drawing Figure

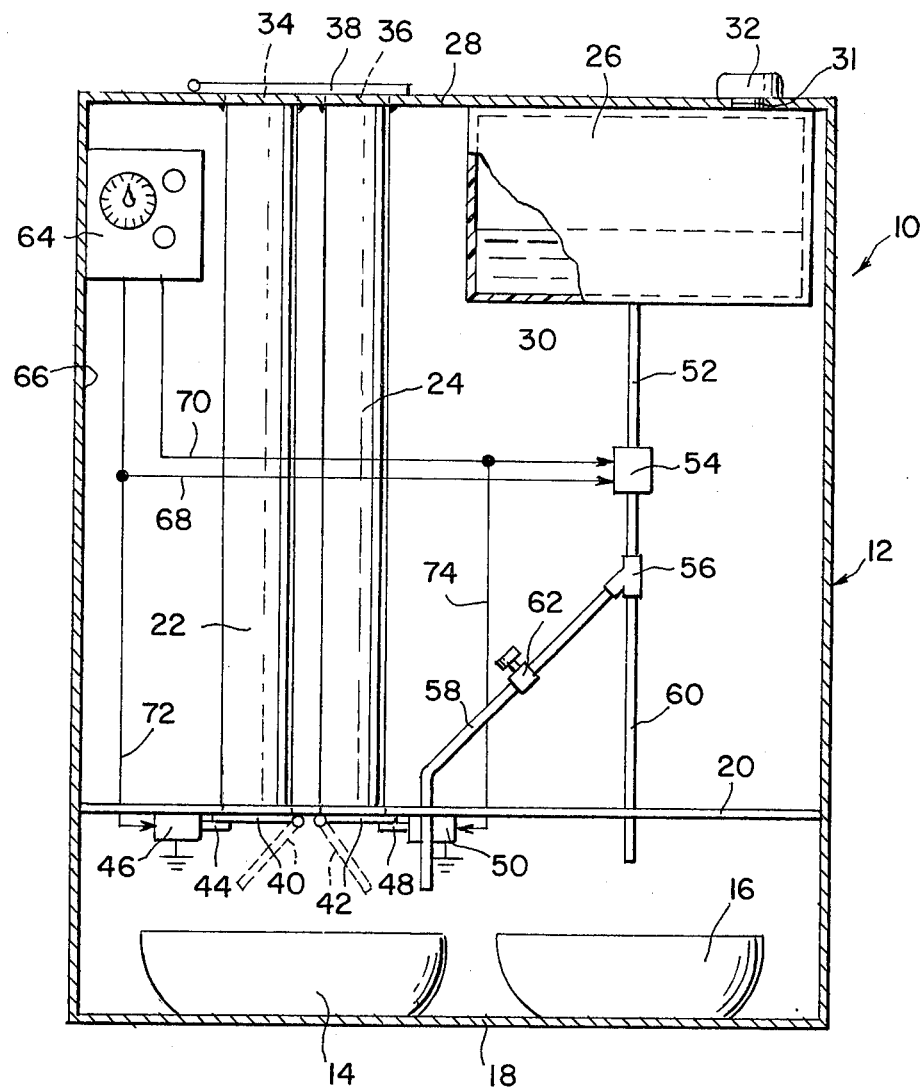

AUTOMATIC PET FEEDER

BACKGROUND OF THE INVENTION

The present invention relates to a device for automatically feeding domestic household animals.

It is quite common for members of a household to be absent from their home for an extended period of time, as for example, when a husband and wife both work or a family takes a weekend vacation. Pets, such as dogs and cats, belonging to such a household would normally have to be left alone without attention during the period of absence or placed in a boarding kennel. However, the present invention provides an alternative to these options, by providing a device to automatically dispense food and water to the animal at predetermined intervals.

SUMMARY OF THE INVENTION

In accordance with the invention a cabinet is provided housing a food and water bowl. A pair of food tubes are mounted in the cabinet along with a fresh water tank. An electric timer periodically activates a relay to open a door closing one of the food tubes to enable a predetermined amount of dry pet food to be disposed to the food bowl. Simultaneously, the timer activates a second relay or solenoid valve to enable water to be dispensed from the water tank to both the food and water bowls. A regulating valve is placed in the water line leading to the food bowl to permit only the correct amount of flow of water to mix with the dry pet food dispensed from the food tube. After a time interval, the timer activates the relay associated with the other food tube and the process is repeated.

BRIEF DESCRIPTION OF THE DRAWING

Further objects and advantages of the invention will become apparent from the following description and claims, and from the accompanying drawing, wherein:

The sole FIGURE is a longitudinal cross-sectional view through the cabinet of the pet feeding device of the present invention.

DETAILED DESCRIPTION OF THE PREFERRED EMBODIMENT

Referring now in detail to the drawing, wherein like numerals include like elements, the pet feeding apparatus 10 of the present invention includes a cabinet 12 which has a door (not shown) which when opened will enable a pet, such as a dog or cat, access to a food bowl 14 and water bowl 16 provided on the floor 18 of cabinet 12.

A horizontal partition 20 and a vertical partition (not shown) in cabinet 12 enclose a pair of food tubes 22, 24 and a water tank 26. Food tubes 22 and 24 and water tank 26 are mounted by any suitable means, such as brackets or welding, to the ceiling 28 of cabinet 12. Tubes 22, 24 also extend through partition 20. Water 30 is provided to tank 26 through an opening 31 in ceiling 28 normally closed by a screw cap 32 threadedly disposed in the opening 31. Dry pet food is provided in each of tubes 22, 24 through openings 34 and 36 in ceiling 28 normally closed by a cover plate 38 hinged to the exterior surface of ceiling 28.

Tube 22 is closed by door 40 pivoted to the bottom surface of partition 20, while tube 24 is closed by a similarly pivoted door 42. The plunger 44 of a solenoid or relay 46 normally is extended beneath door 40 to hold the door closed, and similarly a plunger 48 of a solenoid 50 is extended beneath door 42.

Water tank 26 is drained through a pipe 52 having a solenoid-operated valve 54 to open or close the flow. Pipe 52 is branched by a union 56 into two pipe conduits 58 and 60, which extend downwardly through horizontal partition 20. Pipe 58 terminates above food bowl 14 and has a flow regulation valve 62 for regulating the water flow therethrough, while pipe 60 terminates above water bowl 16.

A conventional electric timer 64 mounted on a side wall 66 of cabinet 12 is electrically connected by wires 68 and 70 in electrical series with solenoid-operated valve 54, and by wires 72 and 74 to grounded relays 46 and 50, respectively. Timer 64 is preset to cause relays 46 and 50 to be actuated at different timed intervals to retract plungers 44 and 48, respectively, which in turn will cause doors 40 and 42 to drop open by gravity to dispense the dry pet food in tubes 22 and 24, respectively, into food bowl 14. Simultaneously, solenoid valve 54 is opened for a predetermined interval to allow water 30 to flow from tank 26 through pipe 52 and branch pipes 58 and 60 to the food bowl 14 and water bowl 16. Water dispensed to food bowl 14 is regulated by valve 62 to provided the correct amount to admix with the dry pet food which is dispensed through one of the tubes 22, 24.

The cycle of timer 64 can be set to cover one or two days or longer, as desired. Once either door 40 or 42 is opened, the tubes 22, 24 can be refilled and plungers 44 and 48 reset along with timer 64. Valve 54 will automatically open and close every time one of doors 40 or 42 is opened.

I claim:

1. Pet feeding apparatus comprising:
   a cabinet having a top wall, a bottom wall, and a pair of side walls extending between said top and bottom walls,
   a horizontal partition in said cabinet between said side walls extending generally parallel to said top and bottom walls, closer to said bottom wall than said top wall,
   a dry pet food bowl and a water bowl in said cabinet beneath said horizontal partitions,
   a plurality of food tubes mounted in said cabinet extending from said top wall to said horizontal partition to feed dry pet food into said dry pet food bowl positioned in said cabinet therebeneath in the space between said horizontal partition and said bottom wall,
   a water tank mounted in said cabinet,
   conduit means connected to said water tank extending between said tank and said horizontal partition for draining water from said water tank into both said dry pet food bowl and said water bowl positioned therebeneath in the space between said horizontal partition and said bottom wall, said conduit means including a main drain pipe and branch drain pipe connected to said main drain pipe extending above each of said bowls,
   a freely pivotable door associated with each of said food tubes to prevent the dispensing of dry pet food from said tubes when closed and to permit the dispensing of dry pet food from said tubes when opened,
   electrical relay means associated with each of said pivotable doors having a retractible plunger in sliding contact with the bottom of each of said doors and normally retaining each said door closed, but responsive to a periodic electrical signal for sequentially retracting said plungers to alternately disengage each of said doors, said doors thereby opening responsive to the force of gravity, electrical timer apparatus in said cabinet for supplying said periodic sequential electrical signal to said electrical relay means, and electrically-operated solenoid valve means in said main drain pipe responsive to the same periodic electrical signal received by said electrical means to sequentially retract each of said plungers for sequentially opening and closing each branch pipe of said conduit means for a predetermined timed interval to drain water from said tank into said dry pet food bowl and said water bowl.

2. Pet feeding apparatus in accordance with claim 1 including pivotable cover means hinged to said top wall over said food tubes.

* * * * *